July 9, 1968    A. M. NICKOLOFF ET AL    3,391,524

SAFETY GUARD FOR POWER MOWERS

Filed Oct. 12, 1965

Alex M. Nickoloff
John C. Finfrock
INVENTORS

BY *[signatures]*
Attorneys

United States Patent Office 3,391,524
Patented July 9, 1968

3,391,524
SAFETY GUARD FOR POWER MOWERS
Alex M. Nickoloff, 5383 E. Atherton Road, Flint, Mich. 48507, and John C. Finfrock, 1035 W. Pine St., Mt. Morris, Mich. 48458
Filed Oct. 12, 1965, Ser. No. 495,247
4 Claims. (Cl. 56—25.4)

ABSTRACT OF THE DISCLOSURE

An elongated perforated plate has a top flange hingedly joined by spring-biased hinges to the top wall of a power mower housing. This plate slopes outwardly and downwardly, spans the customary cuttings discharge opening and provides a safety deflecting shield. There is an outstanding ledge-like flange on the lower edge of the plate. The normal leading end of the flange is provided with a swivelly mounted terrain accommodating caster which is vertically adjustable and acts to change the angle between the plate and discharge opening.

---

The present invention relates to power operated lawn mowers characterized by a rollable wheel supported housing for a motor-driven rotating blade and wherein the usual depending skirt or rim of the housing is provided with the customary discharge opening for whirlable cuttings and clippings.

The object of the present invention is to provide a safety-type guard for the aforementioned discharge opening and, in doing so, to structurally and functionally improve upon prior art guards and shields and to provide a significant advance in the art.

Briefly, the present invention comprises an outwardly and downwardly sloping shield or plate having means cooperable with its upper lengthwise edge whereby said plate is mounted on the housing in line with the discharge opening and is capable of assuming an angular slope relative to the horizontal so that the plate constitutes and provides a deflector for grass cuttings, twigs, pebbles and stones such as are likely to be picked up by the rotating blades and dangerously hurled through and beyond said discharge opening.

In carrying out the principles of the present invention the plate is preferably rectangular but not necessarily so and is of a length commensurate with the length of the opening with which it is adapted to cooperate. The plate features an upper longitudinal laterally directed flange carrying spring loaded hinges wherein leaves thereof are arranged to be mounted on a cooperating top wall part of the aforementioned motor and blade housing.

The invention also features a plate which is highly perforated for venting of pressurized air currents swirling from beneath the housing through the opening whereby to provide the safeguarding feature desired without obstructing the escape of cuttings and small objects through the discharge opening.

An equally important objective is to utilize and provide a simple, practical and economical safety guard and control for the aforementioned opening which aptly serves the purposes for which it is intended particularly because of the fact that the spring biased lower longitudinal edge of the plate has proper clearance with the ground or surface at all times and, what is more important, utilizes a swivelly mounted caster which is not only held yieldingly in contact with the terrain but causes the leading end or edge of the plate to automatically adapt itself to the irregularities of the terrain which is traversed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
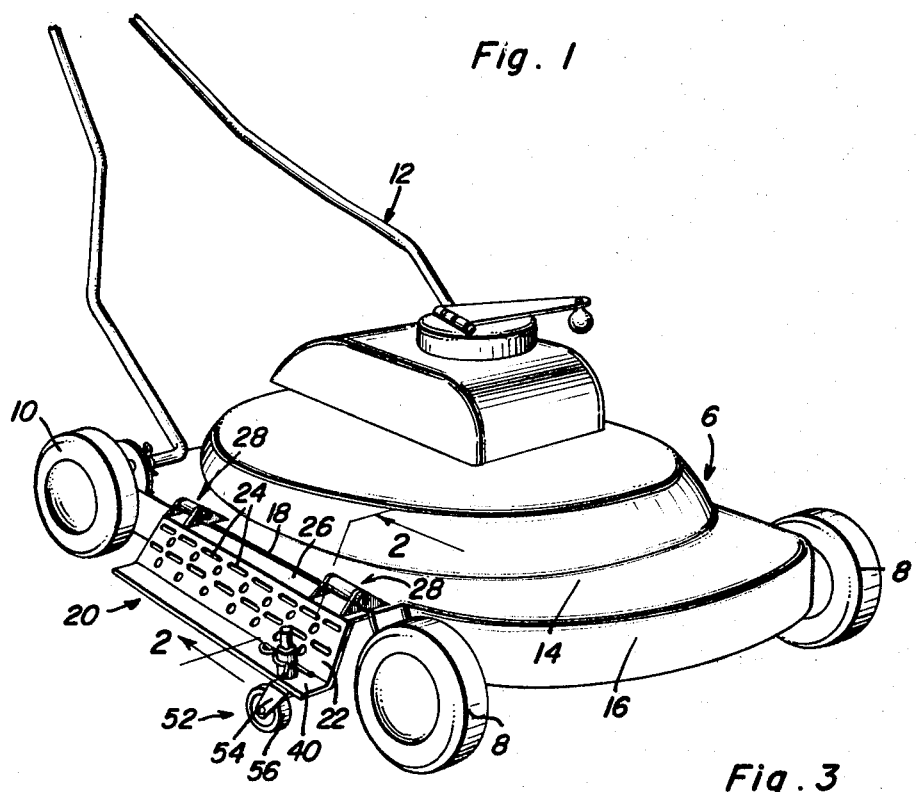
FIGURE 1 is a view in perspective of a somewhat conventional-type power lawn mower with self-contained facilities including a rotary cutting blade and wherein the side cuttings discharge slot or opening is shielded by the improved safety guard herein comprehended.
Figure 2:
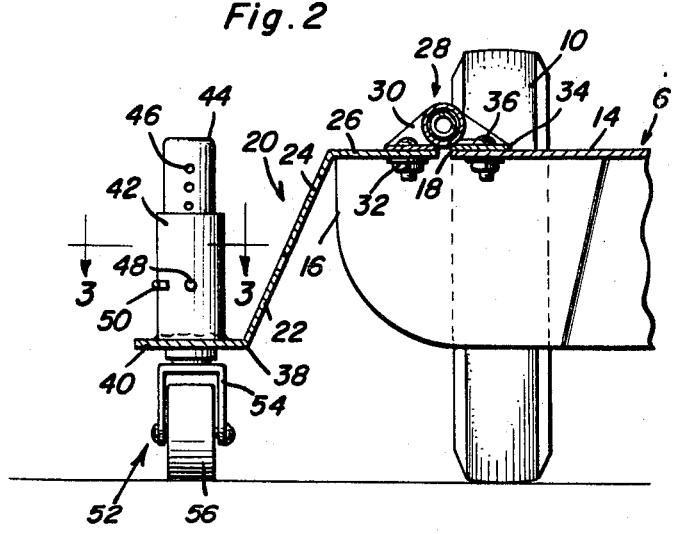
FIGURE 2 is an enlarged fragmentary view in section and elevation taken on the plane of the line 2—2 of FIGURE 1.

The power lawn mower shown in FIGS. 1 and 2 comprises a housing 6 which is supported by front and rear wheels 8 and 10, which is provided with a push-pull type handle 12, embodies a motor-driven rotary blade (not shown) and is characterized by generally horizontal top wall means 14 and a depending encompassing apron or skirt 16. The skirt is provided on one side, as is generally the case, with a cutaway portion which defines a slot constituting the aforementioned cuttings and clippings and small objects discharge opening 18.

Figure 3:
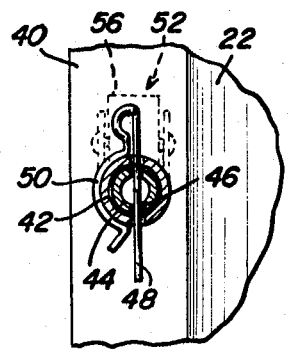
FIGURE 3 is a horizontal section on the horizontal section line 3—3 of FIGURE 2.

The attachment comprises a horizontally elongated pivotally mounted protective guard or shield which is denoted, generally speaking, by the numeral 20. More specifically this guard is characterized by a rectangular flat-faced rigid plate 22 provided with a multiplicity of suitably sized and arranged apertures or venting holes 24. The upper edge, that is, preferably the entire lengthwise upper edge is provided with adapter means. More specifically this means comprises a relatively narrow horizontal flat-faced attaching flange 26 which when in a normal position is substantially coplanar with the top plate portion 14 as shown in FIGURE 2. To achieve the desired results spring-loaded or spring-biased means, preferably spring-loaded hinges 28 are provided. One leaf or component 30 is bolted as at 32 to the flange 26 and the other leaf or component 34 is bolted as at 36 to the housing so that the flange 26 overhangs the discharge opening or slot 18 while the plate proper, the plate 22, slopes downwardly and outwardly and provides a deflecting-type guard. The lower lengthwise edge portion 38 is provided with an integral outstanding ledge-like flange 40 which is to be held in a plane above the plane of the terrain or ground which is traversed. To obtain this end the forward or leading end portion of the flange is provided with an upstanding cylindrical socket member 42 in which a sleeve 44 is removably and adjustably mounted, said sleeve having selectively usable keeper holes 46 for the keeper pin 48 (FIG. 3) of the attachable and detachable cotter key 50. The structure thus provided serves to accommodate a swivelly mounted caster unit 52 characterized by a yoke of fork 54 swivelly mounted in the sleeve and carrying a free turning ground engaging roller or wheel 56.

With the construction shown and described it will be evident that the swivel-type caster wheel not only has turning movement in a horizontal plane about a vertical axis and accordingly rotates 360 degrees, it can be bodily adjusted by way of the sleeve or tubular shank 44 and cotter pin to adjust the position of the lower flange and the angularity of the guard plate to effectually control the valving and shielding action of the discharge opening means in the manner evident, it is believed, from FIGS. 1 and 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A safety guard attachment for a grass cuttings discharge opening such as is commonly provided in the depending marginal skirt of the housing on a power lawn mower comprising: an elongated plate conformable in length and height with said discharge opening, said plate having a laterally outwardly directed flange across its bottom edge, said flange having a forward leading end provided with a fixed tubular member providing a socket, a sleeve detachably and vertically adjustably mounted in said socket, and a caster embodying a fork mounted on said sleeve and a roller mounted for free rotation in said fork.

2. The structure according to claim 1, and wherein said plate is rectangular and substantially flat and provided with a multiplicity of apertures.

3. In a power mower, in combination, a housing for a rotary cutting blade, said housing embodying a horizontal top wall marginally provided with an encompassing depending skirt having the usual normally open grass cuttings discharge opening, a guard opposed to, spanning said opening and providing a safety shield, said guard comprising an elongated plate having a lateral plate mounting flange extending across its longitudinal top edge, said flange being normally coplanar with said top wall, said plate assuming an outwardly and downwardly sloping oblique angled position relative to said skirt, hinge means mounting said flange and consequently said plate in said sloping oblique angled position, a lateral ledge-like plate lifting and lowering flange joined with and extending lengthwise across the lower longitudinal edge of said plate, and ground engaging, contour compensating, terrain accommodating and traversing means for said plate comprising a caster, and additional means swivelly and detachably mounting said caster on the leading end of said lifting and lowering flange, said caster being vertically adjustable and thus acting to change the angle between said plate and said discharge opening.

4. The structure according to claim 3, and wherein said hinge means comprises a pair of spring-biased hinges carried by said mounting flange and securely fastened and anchored atop said top wall in a manner to orient said plate with said discharge opening and to locate it in an operating position clear of obstructive engagement with the terrain which is being traversed.

References Cited

UNITED STATES PATENTS

| | | | |
|---|---|---|---|
| 2,495,032 | 1/1950 | Stuhl | 56—25.4 XR |
| 2,578,880 | 12/1951 | Doyle | 56—25.4 |
| 2,806,339 | 9/1957 | Whitney | 56—25.4 |
| 2,973,613 | 3/1961 | Hagedorn | 56—25.4 |
| 3,040,503 | 6/1962 | Ogle | 56—25.4 |
| 3,077,065 | 2/1963 | Samways et al. | 56—25.4 |
| 3,190,061 | 6/1965 | Gilbertson | 56—25.4 |

ROBERT E. BAGWILL, *Primary Examiner.*